(12) United States Patent
Vinther et al.

(10) Patent No.: US 9,326,347 B2
(45) Date of Patent: Apr. 26, 2016

(54) LIGHT FIXTURE WITH BACKGROUND DISPLAY USING DIFFUSE PIXELS BETWEEN NONDIFFUSE LIGHT SOURCES

(75) Inventors: Thomas Vinther, Beder (DK); Claus Hansen, Hornslet (DK)

(73) Assignee: Martin Professional ApS, Aarhus N. (DK)

( * ) Notice: Subject to any disclaimer, the term of this patent is extended or adjusted under 35 U.S.C. 154(b) by 0 days.

(21) Appl. No.: 13/642,214

(22) PCT Filed: Apr. 12, 2011

(86) PCT No.: PCT/DK2011/050120
§ 371 (c)(1),
(2), (4) Date: Oct. 19, 2012

(87) PCT Pub. No.: WO2011/131200
PCT Pub. Date: Oct. 27, 2011

(65) Prior Publication Data
US 2013/0039062 A1 Feb. 14, 2013

(30) Foreign Application Priority Data

Apr. 23, 2010 (DK) ................................ 2010 00361
Apr. 6, 2011 (DK) ................................ 2011 00262

(51) Int. Cl.
*H05B 33/08* (2006.01)
*F21S 10/02* (2006.01)
(Continued)

(52) U.S. Cl.
CPC ........... *H05B 33/0857* (2013.01); *F21S 10/023* (2013.01); *F21V 21/30* (2013.01);
(Continued)

(58) Field of Classification Search
CPC ............ H05B 33/0857; H05B 33/0803; F21S 10/023; F21V 21/30; F21Y 2105/001; F21Y 2113/005; F21Y 2101/02; G02B 26/08; G02B 5/0278; F21W 2131/005
USPC ............... 362/240, 244, 246, 249.01–249.03, 362/249.06–249.07, 249.1, 249.14, 11–12, 362/17, 234–238, 355
See application file for complete search history.

(56) References Cited

U.S. PATENT DOCUMENTS

| 4,499,528 | A | * | 2/1985 | Hawlitzki | ..................... 362/275 |
| 6,491,417 | B1 | * | 12/2002 | Haen et al. | ..................... 362/485 |

(Continued)

FOREIGN PATENT DOCUMENTS

| CN | 101322438 A | 12/2008 |
| CN | 201209834 Y | 3/2009 |

(Continued)

OTHER PUBLICATIONS

Machine Translation of EP 1344684 A2.*
(Continued)

*Primary Examiner* — Diane Lee
*Assistant Examiner* — Naomi M Wolford
(74) *Attorney, Agent, or Firm* — Blank Rome LLP

(57) ABSTRACT

The present invention relates to an illumination device comprising:
- a first group of light sources and a number of light collecting means, said light collecting means collect light from said first group of light sources and convert said collected light into a number of source light beams;
- a second group of light sources arranged in an array of pixels, each of said pixel comprises at least one light source and each of said pixels are individually controllable;

where said first group of light sources and said second group of light sources are individually controllable and where at least one of said pixels is adapted to emit light at an area between at least two of said source light beams. The present invention relates also to illumination system comprising such illumination device.

19 Claims, 10 Drawing Sheets

(51) Int. Cl.
| | | |
|---|---|---|
| *F21V 21/30* | (2006.01) | |
| *F21W 131/406* | (2006.01) | |
| *F21Y 101/02* | (2006.01) | |
| *F21Y 113/00* | (2006.01) | |
| *G02B 5/02* | (2006.01) | |
| *G02B 26/08* | (2006.01) | |
| *F21Y 105/00* | (2006.01) | |

(52) U.S. Cl.
 CPC ...... *H05B33/0803* (2013.01); *F21W 2131/406* (2013.01); *F21Y 2101/02* (2013.01); *F21Y 2105/001* (2013.01); *F21Y 2113/005* (2013.01); *G02B 5/0278* (2013.01); *G02B 26/08* (2013.01)

(56) References Cited

U.S. PATENT DOCUMENTS

| | | | | |
|---|---|---|---|---|
| 6,939,027 | B2 * | 9/2005 | Harumoto | 362/336 |
| 7,775,679 | B2 * | 8/2010 | Thrailkill et al. | 362/237 |
| 2006/0139917 | A1 * | 6/2006 | Ward | 362/231 |
| 2006/0152691 | A1 | 7/2006 | Imade | |
| 2008/0259600 | A1 * | 10/2008 | Pohlert et al. | 362/235 |

FOREIGN PATENT DOCUMENTS

| | | |
|---|---|---|
| CN | 2012098834 | 3/2009 |
| CN | 101680636 A | 3/2010 |
| EP | 1344684 A2 * | 9/2003 |
| JP | 2001175201 | 6/2001 |
| JP | 2009009809 | 1/2009 |
| JP | 2010225388 | 10/2010 |
| WO | WO2009016950 | 2/2009 |
| WO | WO2009033051 | 3/2009 |
| WO | WO 2009033051 A1 * | 3/2009 |
| WO | WO2010025737 | 3/2010 |

OTHER PUBLICATIONS

International Search Report; International Application No. PCT/DK2011/050120; International Filing Date: Apr. 12, 2011; 8 pages.
Written Opinion; International Application No. PCT/DK2011/050120; International Filing Date: Apr. 12, 2011; 10 pages.
English Abstract; Japanese Application No. JP2010225388; 1 page.
English Abstract; Chinese Application No. CN201209834; 1 page.
English translation of Claims: Chinese Application No. CN201209834; 1 page.
English abstract; Chinese Application No. CN201209834Y; 1 page.
English abstract; Chinese Application No. CN101322438A; 1 page.
English abstract; Chinese Application No. CN202680636A; 1 page.
English abstract; Japanese Application No. JP2009009809; 1 page.
English abstract; Japanese Application No. JP2001175201; 1 page.
English translation; First Office Action; Chinese Application No. 2011800204249; 7 pages.
English translation; Search Report; Chinese Application No. 201180020249; 2 pages.

* cited by examiner

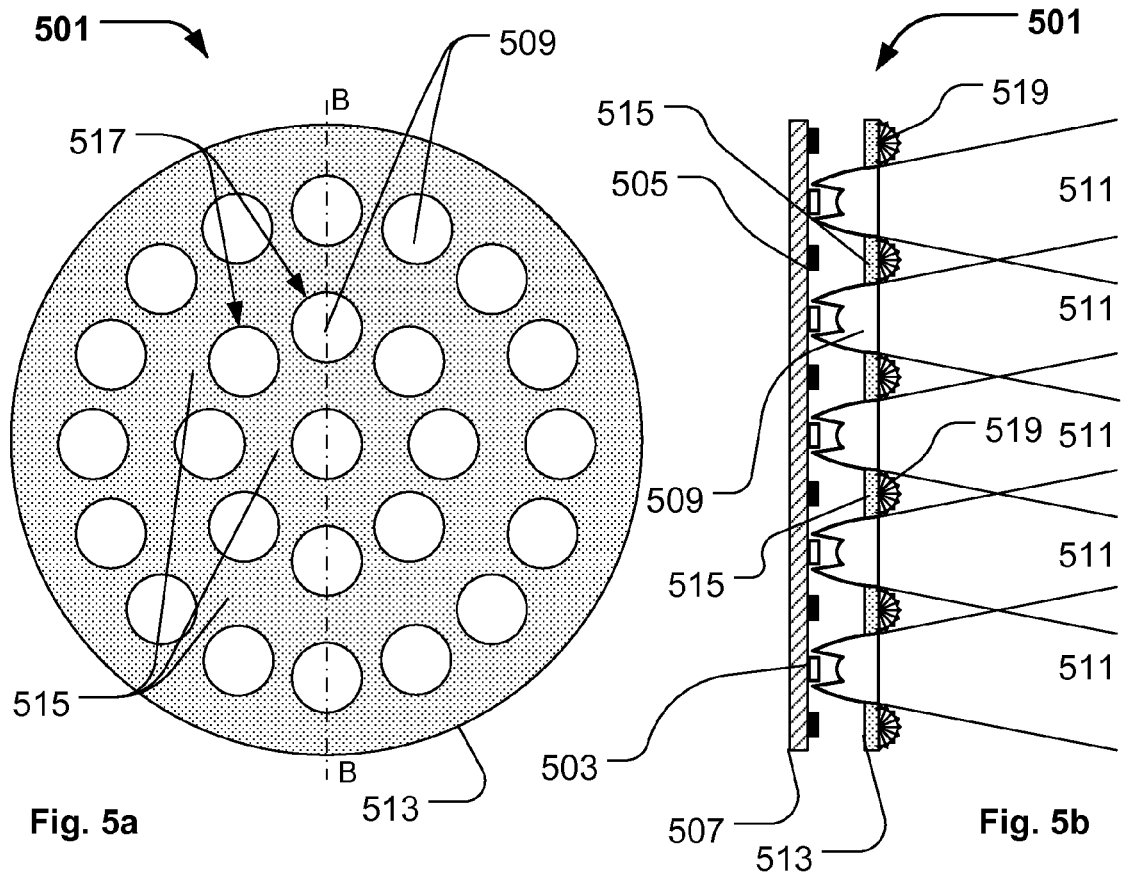
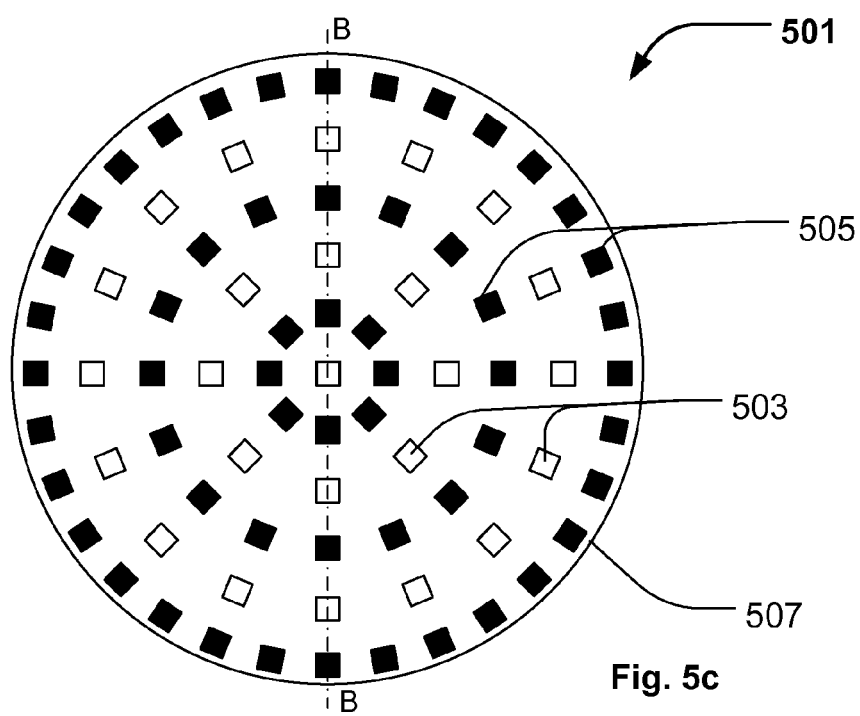
Fig. 5a  Fig. 5b  Fig. 5c

LIGHT FIXTURE WITH BACKGROUND DISPLAY USING DIFFUSE PIXELS BETWEEN NONDIFFUSE LIGHT SOURCES

FIELD OF THE INVENTION

The present invention relates to an illumination device comprising a number of light sources and a number of light collecting means arranged in a housing. The number of light collecting means collect light from at least one of the light sources and convert the collected into a number of source light beams and the light source beams are emitted from said housing.

BACKGROUND OF THE INVENTION

Light fixtures creating various effects are getting more and more used in the entertainment industry in order to create various light effects and mood lighting in connection with live shows, TV shows, sport events or as a part on architectural installation.

Entertainment light fixtures creates typically a light beam having a beam width and a divergence and can for instance be wash/flood fixtures creating a relatively wide light beam with a uniform light distribution or it can be profile fixtures adapted to project an image onto a target surface. There is a tendency that more and more of this kind of fixtures are used in each show or each installation and the fixtures get as a consequence more and more visible for the sectors or TV viewers. The light fixtures typically create the lighting effect at a distance from the light fixture it self and the light fixture is thus not as interesting and esthetic to look at. The fixture manufactures tries as a consequence to provide the fixtures with esthetic designs in order to make the fixtures more interesting to look at. However this is very difficult as the housing of the fixtures typical dependents on physical requirements defined by the technical specifications of the fixture such as optics, mechanics, electronics, cooling etc.

The LED component has further as a light source changed the look of most lighting luminaries, when using multiple LEDs to replace a single light source. This implies for all lighting industries—general, domestic, industrial, entertainment etc. The most visible change is that all multiple light sources are now exposed to the viewer and the light emits from a larger area. Now that most LED fixtures have visible LEDs, some customers dislike the look of multiple light dots. Instead a more uniform, even light exit is requested, to avoid the cheap looking "funfair" look with an extreme amount of light sources. The dotted "funfair" look appears both on light fixtures which mixes the colors before the light is emitted from the housing and also of light fixtures where the colors are mixed in the air or at the wall.

DESCRIPTION OF THE INVENTION

The object of the present invention is to solve the above described limitations related to prior art. This is achieved by an illumination device and illumination system as described in the independent claims. The dependent claims describe possible embodiments of the present invention. The advantages and benefits of the present invention are described in the detailed description of the invention.

DESCRIPTION OF THE DRAWING

FIG. 5a-5c illustrate another embodiment illumination device according to the present invention;

DETAILED DESCRIPTION OF THE INVENTION

The present invention is described in view of a moving head lighting fixture including a number of LEDs that generate a light beam, however the person skilled in the art realizes that the present invention relates to illumination devices using any kind of light source such as discharge lamps, OLEDs, plasma sources, halogen sources, fluorescent light sources, etc. and/or combinations thereof. It is to be understood that the illustrated embodiments are simplified and illustrate the principles of the present invention rather than showing an exact embodiment. The skilled person will thus understand that the present invention can be embodied in many different ways and also comprise further components in addition to the shown components.

Figure 1A:
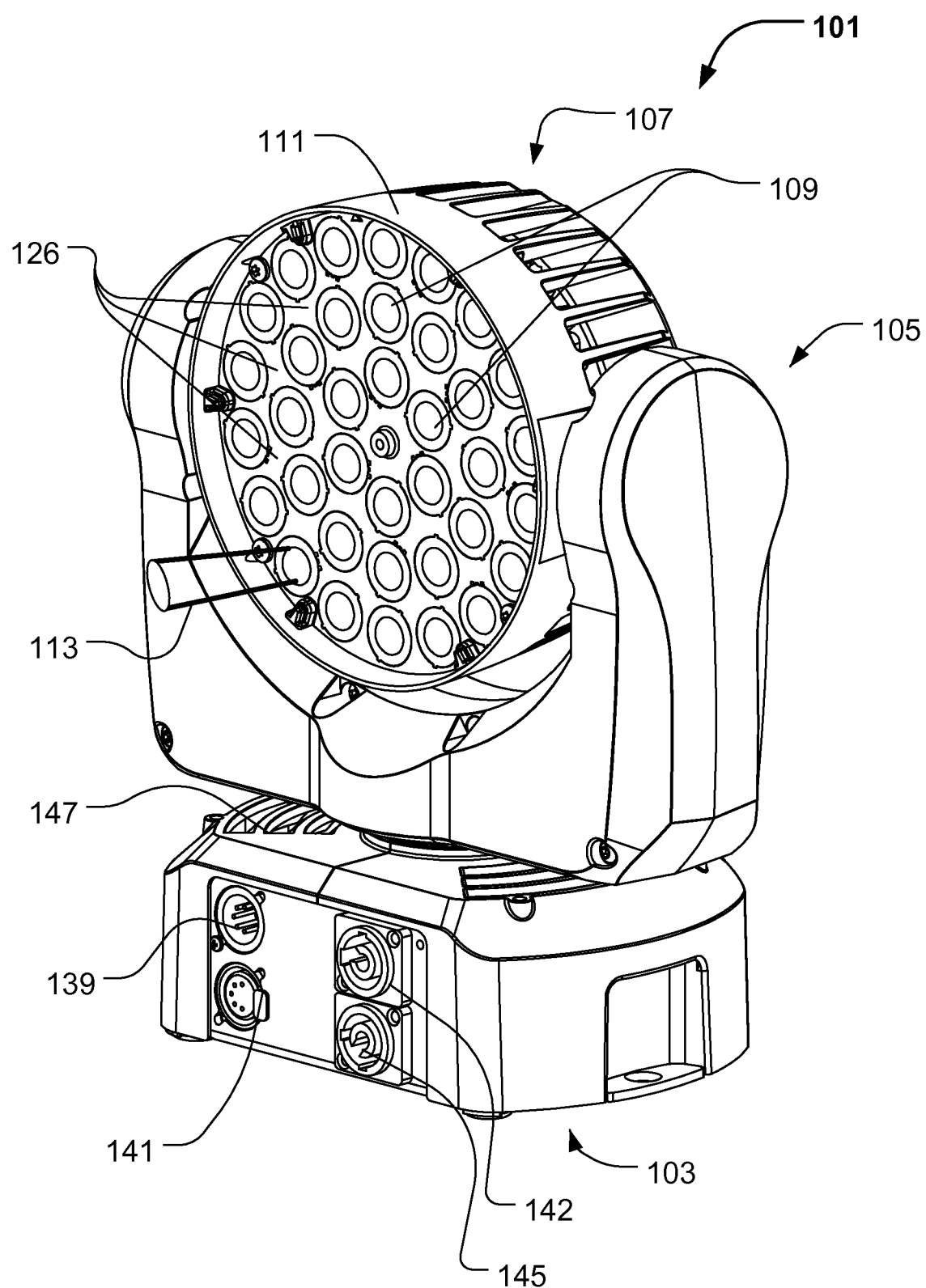
FIGS. 1a and 1b illustrate an example of a moving head lighting fixture according to prior art.
Figure 1B:
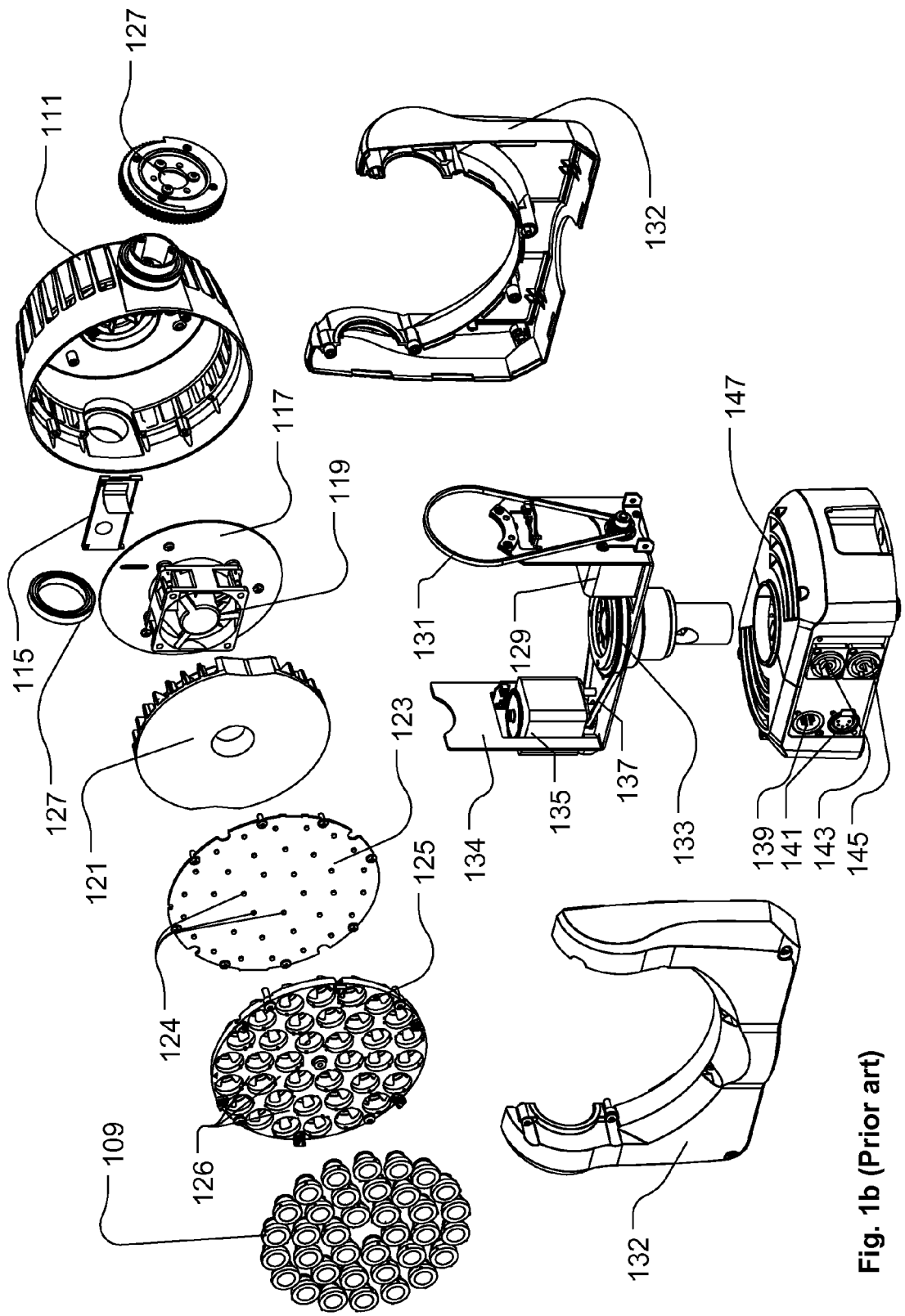

FIG. 1a-1b illustrate an illumination device according to prior art, where FIG. 1a is a perspective view and FIG. 1b is an exploded view. The illumination device is a moving head lighting fixture 101 comprising a base 103, a yoke 105 rotatable connected to the base and a head rotatable connected 107 to the yoke.

In the illustrated embodiment, the head comprises a number of light sources and a number of light collecting means 109 arranged in the head housing 111. The light collecting means collect light from at the light sources and convert the collected light into a number of source light beams 113 (only one illustrated), and which are emitted from the housing.

In the illustrated embodiment the head housing 107 is a "bucket" shaped head housing 111 wherein a display 115 (visible from the rear side of the head), main PCB 117 (Printed Circuit Board), a fan 119, a heat sink 121, an LED PCB 123, and lens assembly are stacked. The LED PCB 123 comprises a number LEDs 124 and the lens assembly comprises a lens holder 125 and a lens array where the lenses constitute the light collecting means 109. Each light collecting means is adapted to collect light form each LED and convert the collected light into a number of light source beams 113. The head is rotatable connected to the yoke by two tilt bearings 127, which are supported by the yoke 105. A tilt motor 129 is adapted to rotate the head through a tilt belt 131 connected to one of the tilt bearings 127. The yoke comprises two interlocked yoke shell parts 132 which are mounted to a yoke frame 134 where on the tilt bearings, tilt motor, pan motor and pan bearing are arranged. The LED PCB 123 comprises a number of LEDs emitting light and which in cooperation with the light collecting means 109 in the lens array generate a number of light source beams. The main PCB comprises controlling circuits and driving circuits (not shown) for controlling the LEDs as known in the art of illumination devices. The main PCB comprises further a number of switches (not shown) which extend through a number of holes in the head housing 111. The switches and display act as a user interface allowing a user to communicate with the moving head lighting fixture.

The yoke are connected to a pan bearing 133 rotatable connected to the base 103. A pan motor 135 is adapted to rotate the yoke through a pan belt 137 connected to the pan bearing 133. The base comprises 5-Pin XLR male 139 and female 141 connectors for DMX signals as known in the art of entertainment lighting; input 143 and output power 145 connectors, power supply PCB's (not shown) and fan (not shown). The fan forces air into the base through vent holes 147.

This prior art illumination device uses multiple LEDs to replace a single light source as known prior the introduction of the LED component as a widely used light source. However such illumination device changes its visible appearance as the multiple light sources are now exposed to the viewer and the light emits from a larger area. If the light luminaries are a color mixing version with single color LEDs, then all LED colors used are visible. However some customers dislike the look of multiple light dots. Instead a more uniform, even light exit is requested, to avoid the cheap looking "funfair" look with an extreme amount of light sources.

The illuminating device illustrated in FIGS. 1a and 1b is just one example of a prior art illumination derive and the skilled person realize that a large number of different embodiments provided by a large number of manufactures exits.

Figure 2A:
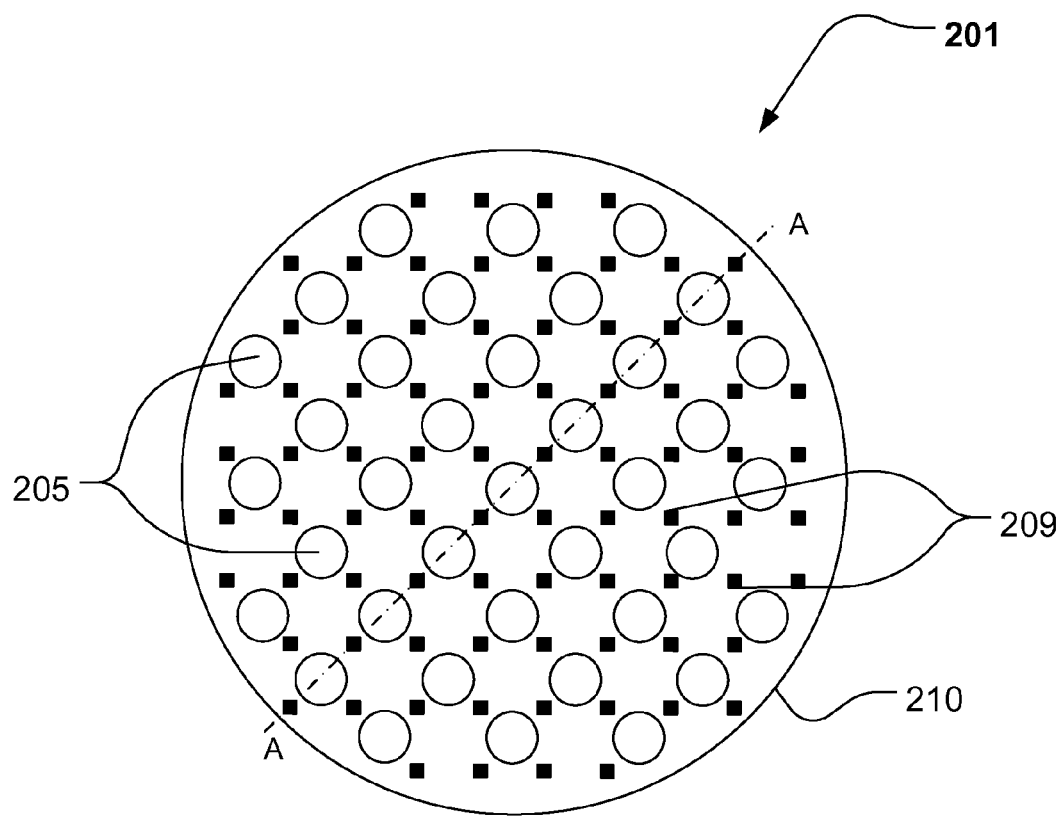
FIG. 2a-2b illustrate an embodiment of an illumination device according to the present invention.
Figure 2B:
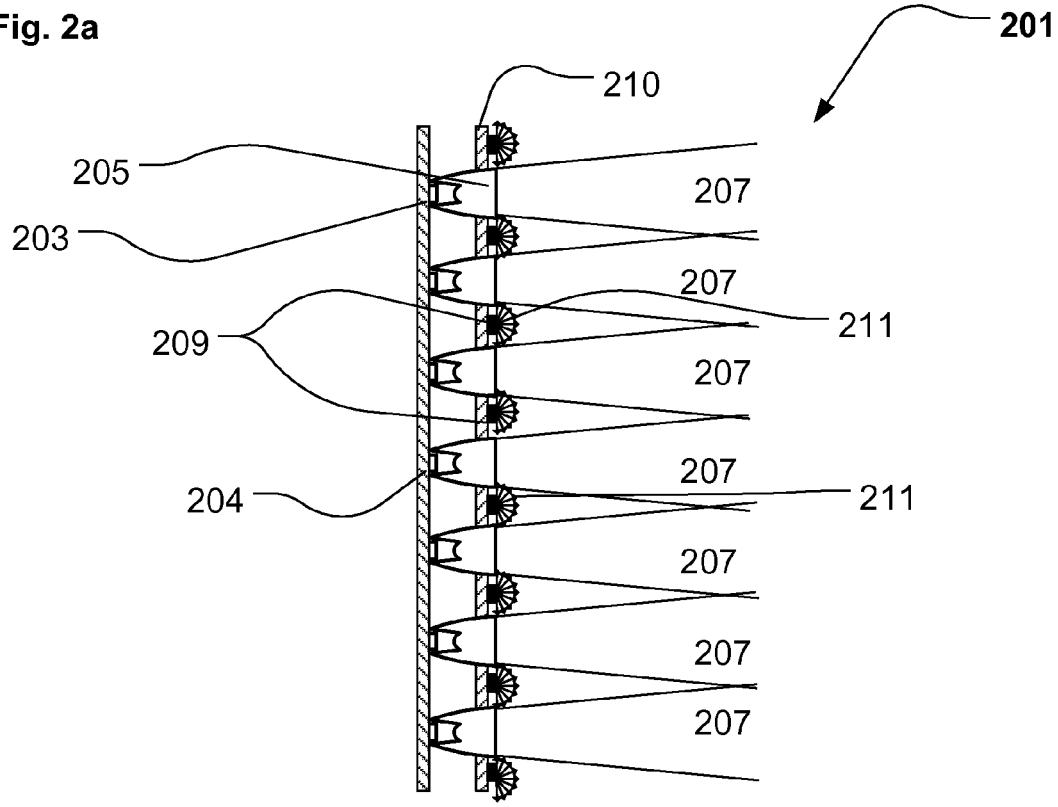

FIGS. 2a and 2b illustrate a simplified embodiment of the illumination device 201 according to the present invention where FIG. 2a illustrates a top view and FIG. 2b illustrates a cross sectional view along line A-A.

The illumination device 201 comprises a first group of light sources 203 (illustrated as white quadrangles) mounted one a PCB 204. A number of light collecting means 205 are arranged above the light sources 204 and the light collecting means 205 collect light from the first group of light sources and convert the collected light into a number of source light beams 207. The light collecting means 205 can be embodied as any optical component capable of collecting light from the light sources and convert the light into light beams and can for instance be optical lenses, light mixers, TIR lenses etc. In the illustrated embodiment the light collecting means 205 are embodied as TIR lenses as known in the prior art and the skilled person realizes that the TIR lens can be designed according the light output of the light source and the descried optical properties of the source light beam 207. The light beams 207 will merge into one large light beams as the distance to the illumination device increases.

A second group of light sources is arranged in an array of pixels 209 (illustrated as black quadrangles. Each pixel 209 comprises at least one light source and is arranged on a PCB 210 and each pixel can be individually controlled by a controller not shown, for instance in order to change color or intensity. Each pixel is adapted to emit light in many directions as illustrated by arrows 211 whereby the pixels can observed from many directions. Further at least one of the pixels is adapted to emit light at an area between at least two of the source light beams 207. The area between at least two light source beam can be defined as all points which seen from above the light source beams lie on a straight line that intercepts at least a part of both light beams. It is to be understood that many straight lines will intercepts at least a part of both light beams and the area between the two light source beams thus constitutes a surface. Further it is to be understood that the area physically can lie below or above the light sources as long as it appear as being between the light sources when observed from above. The PCB is provided with a number of holes adapted to accommodate the light collecting means 205.

The consequence is that a new light effect can be created as the area between the light beams can be illuminated by the pixels and can thus be adapted emit another color than the first group of light sources. This look can by dynamic if first group of light sources and the second group of light sources are individually controlled as known in the art of entertainment lighting. The pixels can also be adapted to emit light having substantially the same color as the light emitted by the first group whereby the area between the light sources beams is filled with substantially the same color as the light source. The second group of light sources can further be used as a video display as each pixel can be individually controlled and the second group of light sources can thus used the present graphical content which can be seen from many directions. The illumination device according the present invention can thus be used as both video display and illumination device.

As example the prior art illumination device illustrated in FIGS. 1a and 1b can be upgraded to an illumination device according to the present invention by embodying the lens holder 125 as a PCB with a number of holes wherein the light collecting means 109 can be arranged and by mounting the pixels at the areas between the light collecting means 109. Alternatively a PCB comprising the pixel can be arranged at the original lens holder 125. The original LEDs 124 (see FIG. 1b) and the added LEDs (not shown in FIG. 1b) and are adapted to function as respectively a first group and a second group of light sources that can be controlled individually, where the second group of light sources is arranged in a array of pixels. The skilled person realize that the components of the prior art illumination also need to change in order to control the first and second group of light sources. This can for instance be achieved by embodying the illumination device as illustrated in FIG. 3.

Figure 3:
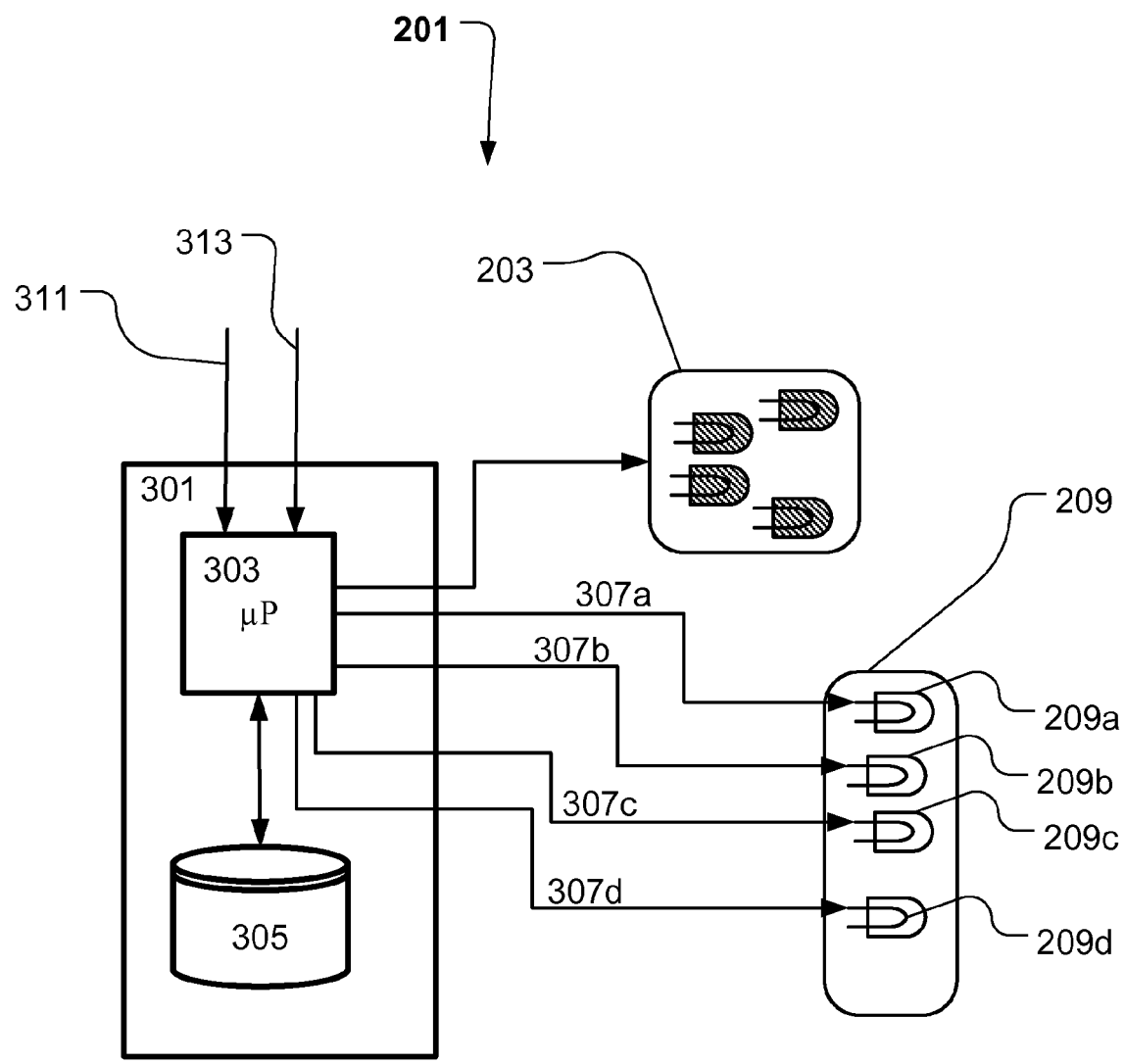
FIG. 3 illustrates a block diagram of a illumination device according to the present invention.

FIG. 3 illustrates a block diagram of the illumination device 201 according the present invention. The illumination device comprises a control unit 301 comprising a processor 303 and a memory 305. The first group of light sources 203 and the second group of light sources 209 is connected to the control unit 301 and is arranged according to the present invention. The second group of light sources is thus arranged in an array of pixels 209a-d.

The processor acts as controlling means and is adapted to control the first group 203 of light sources and the second group 209 of light sources individually. Meaning the processing means can control one of the groups of light sources without controlling the other group of light sources. The controlling can for instance adapted to control the color and/or intensity of the light sources and can be based on any type of communication signals known in the art of lightning e.g. PWM, AM, FM, binary signals etc. The first 203 and second 209 group of light sources can thus be controlled individually and independently of each other can thus be treated as two individually and independently groups of light sources. The controlling means 301 can further control each pixel 209a-d of the second group of light sources individually as indicated by arrows 308a-d. Meaning the processing means can control each pixel without controlling other pixels. Each pixel 209a-d can be connected to the controlling unit through a communication line as illustrated, however it is also possible to connect the pixels to the same communication line and using addressing as known in the art of display systems.

The controlling means 301 is adapted to act as light controlling means adapted to control the first group of light sources based on a light input signal 311 indicative of at least one light parameter. The input signal 311 can be any signal capable of communication parameters and can for instance be based on one of the following protocols USITT DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17-2006). The light parameter can for instance be indicative of the color and brightness that the first group of light sources is supposed to generate. However the light parameter can also be indicative of other parameter such as position of a moving head light fixture, zoom level in case the light fixture comprises as zoom system, strobe speed etc. as known in the art of entertainment lighting.

The controlling means 301 is also adapted to act as video controlling means adapted to control the pixels based on a video signal 313. The video signal can be any signal comprising video/pixel/graphical information and can be provided using any communication protocol suitable for communicating video/pixel/graphical information. Further video controlling means can be adapted to receive the video signal from the memory 305 which for instance can store different video content.

The input signal can for instance be indicative of a first target color being any parameter defining the color of the light that the first group light sources shall generate, for instance RGB values, color coordinates in color maps etc. The controlling means can be adapted to control the second group of light sources based on the input signal indicative of the first target color of whereby the second group of light sources can be adapted generate substantial the same color as the color generated by the first group of light sources. However it is also possible to integrate a color scheme such that the color of the second array is adjusted such that the color of the second group of light sources is different but esthetic matches each other according to a predetermined color scheme. The input signal can also be indicative of a second target color and the color of the second group of light sources can be controlled based on this second target color parameter.

Figure 4:
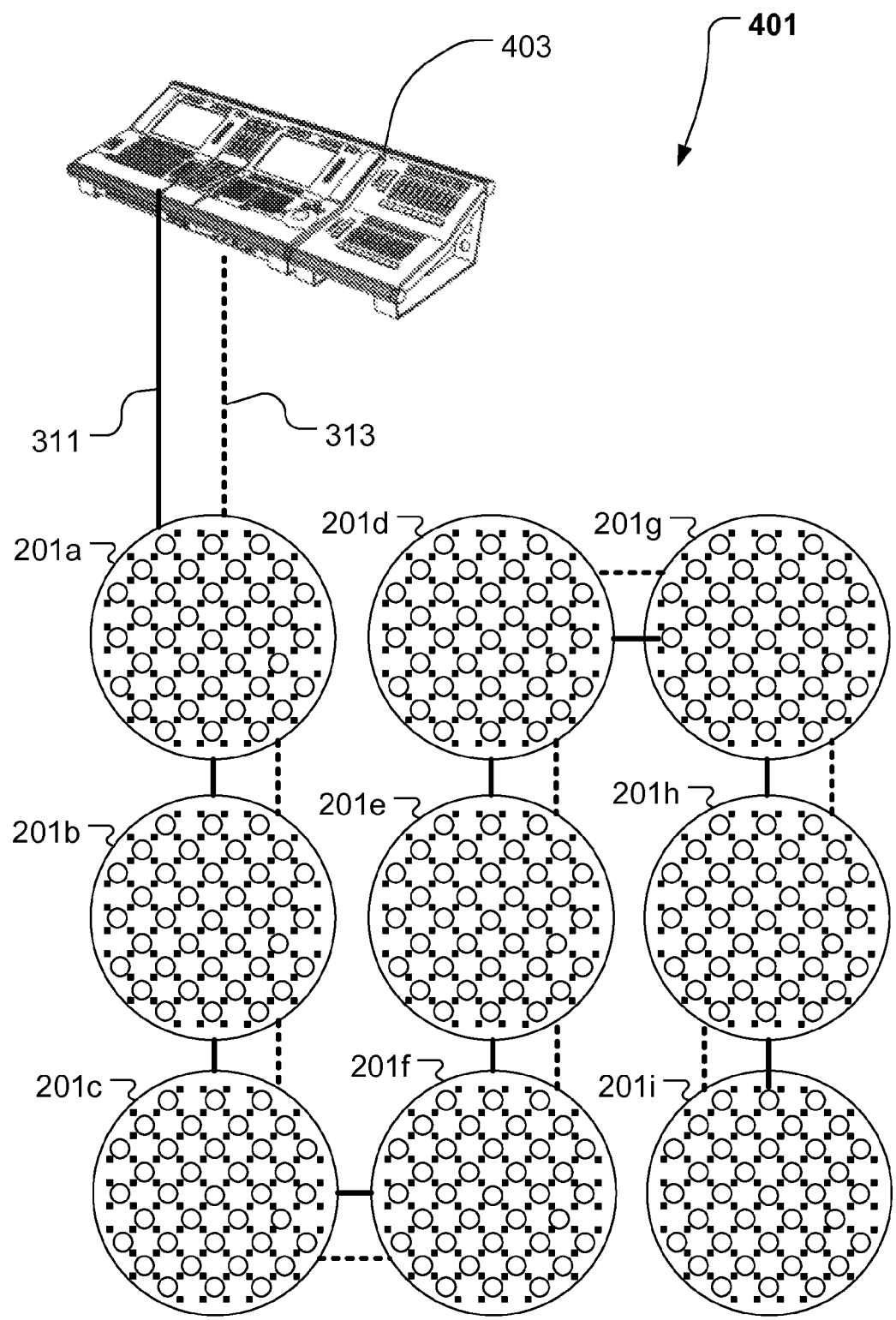
FIG. 4 illustrates a block diagram of a illumination system according to the present invention.

FIG. 4 illustrates a block diagram of an illumination system 401 according the present invention. The illumination system 401 comprises a central controller 403 connected to and controlling a number of illumination devices 201*a*-201*i*. The illumination devices 201*a*-201*i* are embodied according the present invention and as described above. The skilled person realizes that other types of illumination devices also can be included in the illumination system. The central controller 403 can be embodied as a light controller or as a media server as known in the art of entertainment lightening and for instance of a type provided by the applicant. The central controller 403 comprises means for communicating a light input signal 311 to the illumination devices 201*a*-201*i* and the illumination devices 201*a*-201*i* uses this light input signal to control the first group of light sources as describe above. In this embodiment the illumination devices 201*a*-201*i* is daisy changed as known according to the DMX protocol which is used to communicate the light input signal. The central controller 403 comprises also means for communicating a video input signal 313 (illustrated in dotted lines) to the illumination devices 201*a*-201*i* and the illumination devices 201*a*-201 uses this video signal to control the pixels of the second group of light sources as describe above. In this embodiment the video input signal is also daisy changed however the skilled person realize that the video input signal can be feed individually to each illumination device 201*a*-201*i* as known in the art of display systems. For instance it is possible to distribute the video signals using the P3 protocol presently provided by the applicant. In the illustrated embodiment the illuminations devices 201*a*-201*i* are arranges in a 3×3 matrix and the central controller is adapted to divide the video/graphical content into subparts and distribute each sub-part the different illumination devices. As a consequence the entire matrix can be used to create one display. The first group of light sources of the illumination devices 201*a*-201*i* can be used to create midair effects. In the case were the illuminations devices have been integrated into the head of a moving head light fixture the entire matrix can be moved whereby new and existing light and video effects can be created.

FIGS. 5*a-c* illustrate another embodiment of the illumination device 501 according to the present invention. FIG. 5*a* illustrate a top view, FIG. 5*b* illustrates a cross sectional view along line B-B and FIG. 5*c* illustrates a top view with the diffuser cover removed.

The illumination device 501 comprises a number of light sources arranged in a first group of light sources 503 (indicated as white quadrangles) and in a second group of light sources 505 (indicated as black quadrangles). As described above the light sources of the second group are arranged in an array of pixels and each pixel comprises at least one light source and can be individually controlled, for instance in order to change color or intensity. A number of light collecting means 509 are arrange above and around the first group light sources 503 and is adapted to collect light from the first group of light sources and convert the collected light into a number of source light beams 511. The light collecting means 509 can be embodied as any optical component capable of collecting light from the light sources and convert the light into light beams and can for instance be optical lenses, light mixers, TIR lenses etc. In the illustrated embodiment the light collecting means 509 are embodied as TIR lenses as known in the prior art and the skilled person realizes that the TIR lens can be designed according the light output of the light source and the descried optical properties of the source light beam 511. The light beams 511 will merge into one large light beams as the distance to the illumination device increases. Each diffuser region revises light form one pixel and each diffuser region can thus be used to crates a graphical pattern.

The illumination device comprises a diffuser cover 513 arranged above the PCB 507 and the diffuser cover comprises at least one diffuser region 515 and at least one non-diffusing region 517. The diffuser regions receive 515 light generated by the second group of light sources 503 and diffuse the received light in many directions as illustrated by arrows 519. The consequence is that a new light effect can be created as the area between the light beams can have another color emitted by the second group of light sources. This look can by dynamic if the first group of light sources and the second group of light sources are individually controlled as known in the art of entertainment lighting. The second group of light sources can also be adapted to emit light having substantially the same color as the light emitted by the first group whereby the surface of the illumination device appears as one surface having the same color. The diffusing regions can be arranged between the non-diffusing regions whereby the dotted look can be avoided as the areas between the non-diffusing regions now have substantially the same color as the light beams 511 exiting the illumination device through the non-diffusing regions.

Figure 6B:
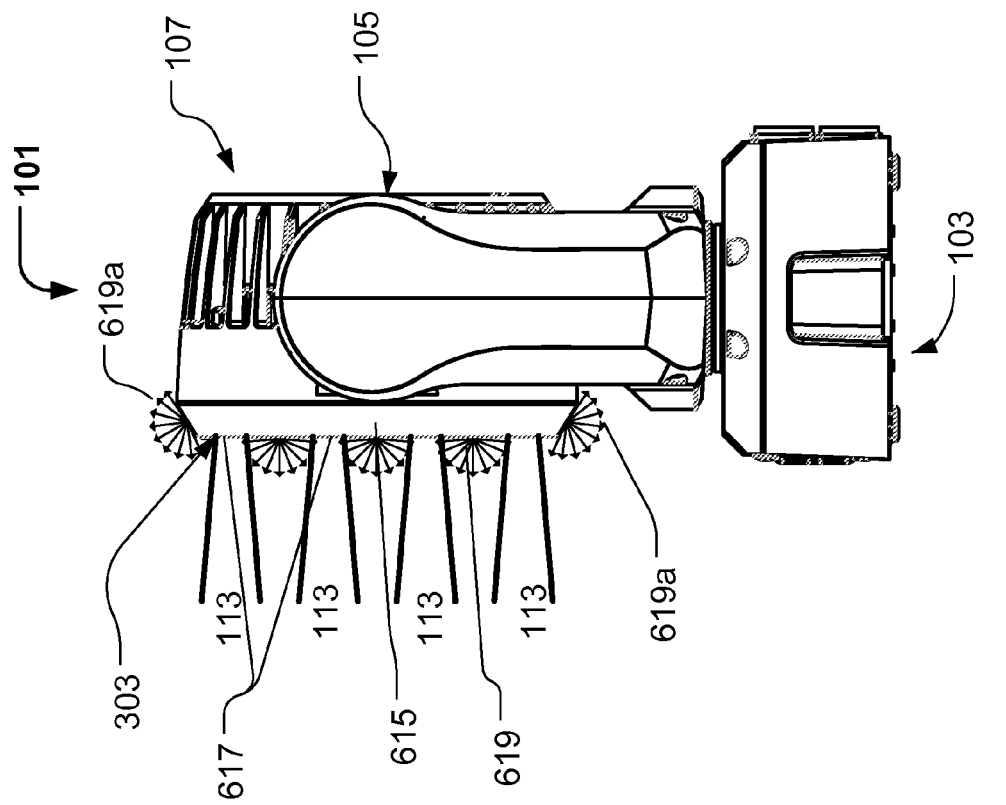
FIGS. 6a and 6b illustrate the illumination device of FIG. 1a-1b which has been modified into an illumination device according to the present invention.
Figure 6A:
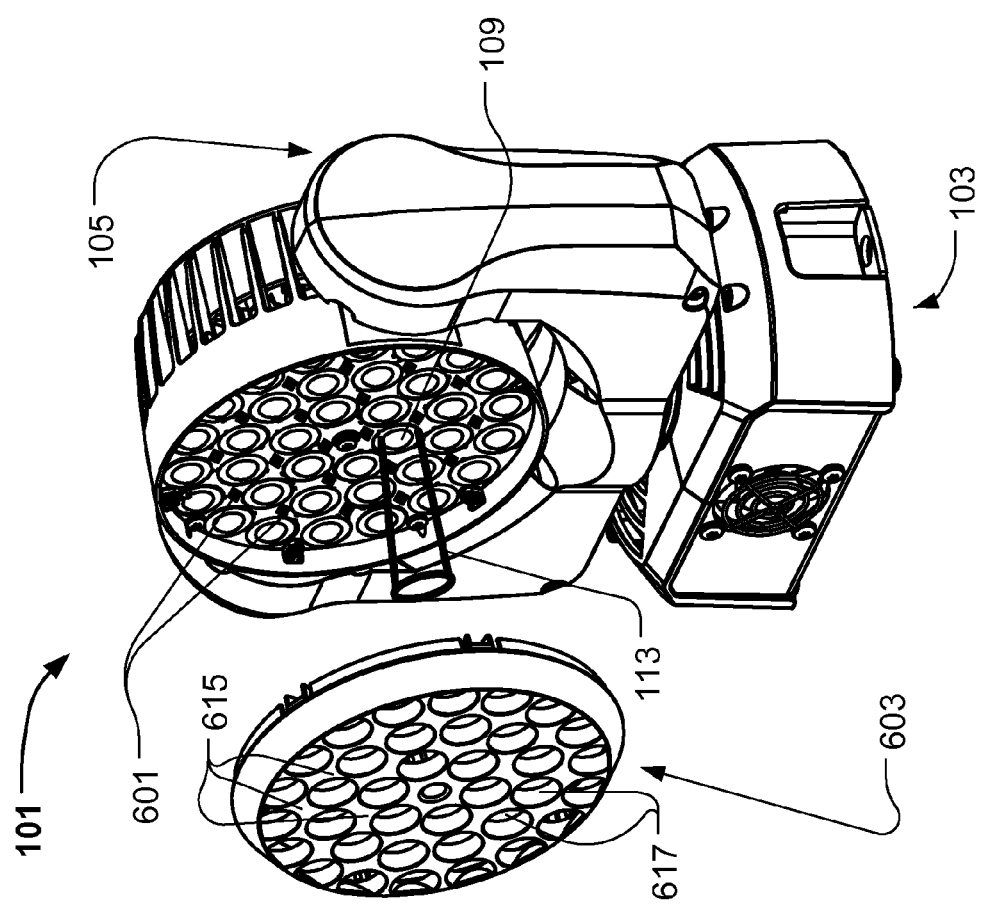

FIG. 6*a* and FIG. 6*b* is respectively a perspective view and a side view of the illumination device of FIG. 1*a*-1*b* which has been modified into an illumination device according to the present invention as described in FIG. 5*a*-5*c*.

In this embodiment a number of LEDs 601 (illustrated as black quadrangles) has been mounted at the lens holder 125 between the light collecting means 109. This can for instance be achieved by embodying the lens holder as a PCB with a number of holes wherein the light collecting means can be arranged or by adding a PCB to the original lens holder. The original LEDs 124 (see FIG. 1*b*) and the added LEDs 301 and are adapted to function as respectively a first group and a second group of light sources that can be controlled individually.

Further the head housing comprises a diffuser cover 603 (exploded from the housing in FIG. 6*a* and mounted in FIG. 6*b*) comprising at least one diffuser region 615 and at least one non-diffusing region 617. The diffuser regions 617 receive at least a part of the light generated by the second group light sources and diffuses the received light as indicated by arrows 619 (only indicated on FIG. 6*b* for the sake of simplicity). At least at part of the number of source light beams 113 pass through the non-diffusing regions 615 without being diffused. It is to be noted that only some of the light source beams are illustrated for the sake of simplicity. The result is that the dotted LED front look is removed, by lighting up the diffuser cover as light is emitted from both the non-diffusing regions and diffusing regions and the areas between the lenses are illuminated with the existing internal stray light from the LEDs are diffused into the surroundings. Since each pixel can be individually controlled the diffusing regions 615 can be used to present video/graphical content.

At least a part of the diffuser cover 603 protrudes from the housing and a part of the light is as a consequence diffused sideways and backwards (as indicated by arrows 619*a*) in relation to the source light beams. The diffusing regions of the diffuser cover can be lit up both from behind the surface and from the side and thereby function as a light guide. The light fixture can as a consequence be viewed from multiple angles and the protruding diffuser cover provides a new light effect to the light fixture.

The non-diffusing regions can be embodied as clear areas like plane transparent surfaces arranged above the light collecting means. Such clear plane transparent surfaces will allow the light source beams to pass without diffusing the light source beams. However the clear areas can be adapted to adjust the beam divergence of the light source light beam but the outgoing light beam will still be a well defined light beam. The diffuser cover can thus be embodies in clear polymer where the diffusing regions are created by etching the surface of the diffuser cover. The diffusing region can also be created by coating the regions where the diffusing region is to be positioned. The diffusing cover can further be molded where the moulds are adapted to define the non diffusing regions and the diffusing regions. The non diffusing regions can also be embodied as aperture or cut outs arranged above said light collecting means.

The diffuser cover can also comprise fastening means which enables a user to attach a diffuser cover to an illuminating device. The diffuser cover can thus be provided as a standard component or as an optional accessory. By embodying the diffuser cover as a removable accessory gives the use the opportunity to use the illumination device with and without the diffuser cover. The result will be the fact that the second group of light sources appears a clear pixels when the illumination device is used without the diffuser cover and whereas each pixel appears as a smoother pixels when the illumination device is used with the diffuser cover.

Figure 7A:
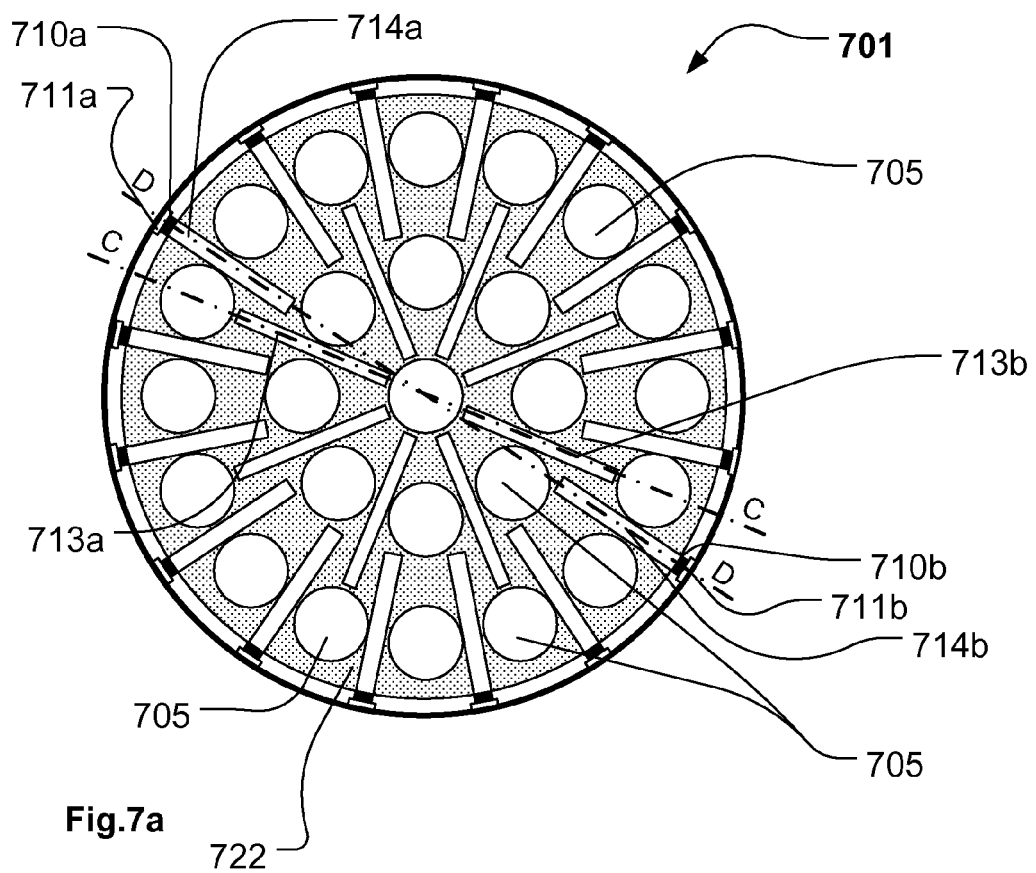
FIG. 7a-7d illustrate another embodiment illumination device according to the present invention.
Figure 7B:
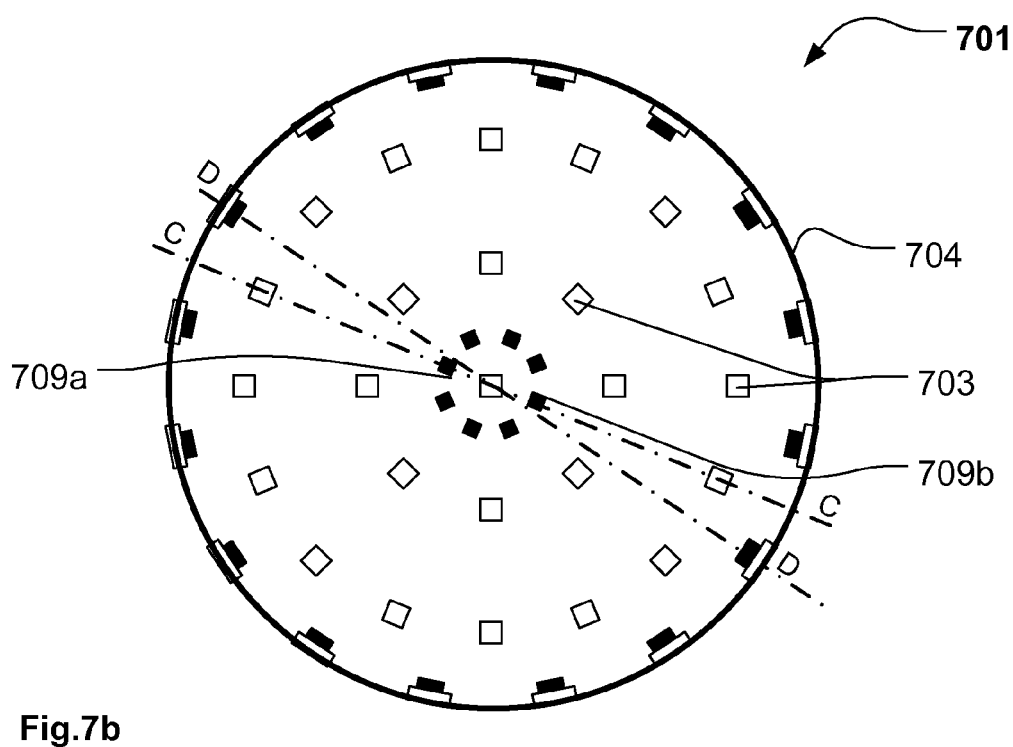
Figure 7C:
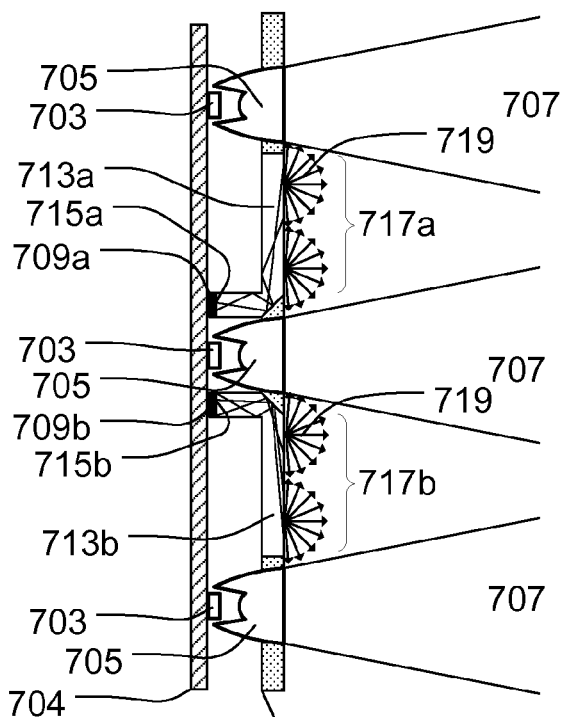
Figure 7D:
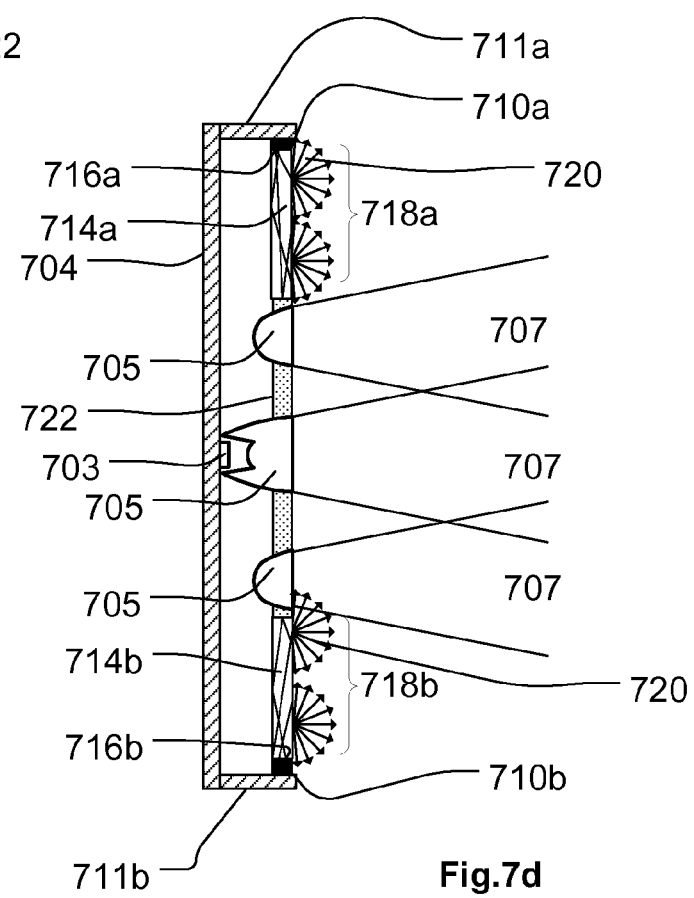

FIGS. 7*a*-7*d* illustrates another embodiment of an illumination device 701 according to the present invention. FIG. 7*a* is a top view and FIG. 7*b* is a top view with the light guides and collecting means removed. FIGS. 7*c* and 7*d* is cross sectional views along line C-C and D-D respectively.

The illumination device 701 comprises a first group of light sources 703 (illustrated as white quadrangles) mounted one a PCB 704. A number of light collecting means 705 are arranged above the light sources 703 and the light collecting means 705 collect light from the first group of light sources and convert the collected light into a number of source light beams 707. The light collecting means 705 can be embodied as any optical component capable of collecting light from the light sources and convert the light into light beams and can for instance be optical lenses, light mixers, TIR lenses etc. In the illustrated embodiment the light collecting means 705 are embodied as TIR lenses as known in the prior art and the skilled person realizes that the TIR lens can be designed according the light output of the light source and the descried optical properties of the source light beam 707. The light beams 707 will merge into one large light beams as the distance to the illumination device increases.

A second group of light sources is arranged in an array of pixels (illustrated as black quadrangles and each pixel comprises at least one light source and can be individually controlled, for instance in order to change color or intensity. In this embodiment at part of the pixels 709 are mounted on the PCB 704 and another part 710 of the pixels are arrange on a number of upstanding PCBs 711 which are perpendicularly in relation to PCB 204.

The illumination device 701 comprises further a number of light guides comprising an input section and an output section. The light guide receives light generated by one of pixels at the input section and transfer the received light to the output section which is adapted to emit the received light at an area between at least two of the source light beams 707.

For instance as illustrated in FIG. 7*c* the light source 709*a* and 709*b* emits a number of light rays (illustrated as thin solid lines) which respectively enter the light guide 713*a* and 713*b* at input section 715*a* and 715*b* and is coupled out of the light guide at output sections 717*a* and 717*b* as illustrated by arrows 719. Further the as illustrated in FIG. 7*d* the source 710*a* and 710*b* emit a number of light rays (illustrated as thin solid lines) which respectively enter the light guide 714*a* and 714*b* at 716*a* and 716*b* and is coupled out of the light guide at output sections 718*a* and 718*b* as illustrated by arrows 720. The light guides are adapted to transfer the light emitted by each pixel to an area between the light source beams and the light is emitted in many directions. The light guides is embodied as a solid transparent material and light rays entering an input section will be internally reflected to an output section where the light rays is coupled out of the light guide. The output sections are adapted to couple the light rays out of the light guide. This can for instance be achieved by adjusting the roughness of the surface of the light guide at the output sections whereby the light rays does not experience total internal reflection when they hit the rough surface and as consequences the light is coupled out of the light guide. Alternatively the surface of the light guide can be treated with a material which will scatter the light hitting the output section.

Another opportunity is to angle to bottom and top surface of the light guide relatively to each other, which results the fact the incident angle of the light rays traveling inside the light guide will change. The light guide and out coupling can for instance be constructed using techniques known in the art of background lighting from TV displays and/or mobile phone displays.

In the illustrated embodiment the output sections of the light guides have been arrange in a predetermined pattern and light will thus exit the light guide at these areas. The consequence is that the second group of light sources can be used to create an optical pattern between the light beams and this optical pattern can be used to create light effects which can be observed by a spectator looking at the illumination device. The pixels can be controlled individually and the different part of the optical pattern individually for instance by turning on/off, changing color certain parts of the predetermined pattern. The predetermined pattern can in this way be used as a dynamic pattern which can be used to crate several of interesting light effects. However it is also possible to arrange the output sections of the light guides in a matrix comprising n row and m columns.

The light guides are embodied as number individual light guides which transfers light from each pixel to an area between the light source beams. For instance the light guides can be embodied as illustrate in FIGS. 8a and 8b. In the illustrated embodiment the light guides and light collectors are supported by a solid body 722 formed as a disc. The solid body is constructed with a number of holes adapted to accommodate the light collecting means 705 and light guides 713 and 714.

Alternatively to the individual light guides the light guides can be embodied as one single light guide where the pixels is adapted to couple light into the light guide and where light form the different pixels are coupled out at different places. Such single light guide can for instance be a solid transparent disc (or any other shape) where the pixels is adapted to emit light into the transparent disc from the side and the light it coupled out of the disc at its front surface.

The illumination device 701 can also comprises a third group of light sources (not shown) arranged on the PCB 704 and a number of diffuser regions (not shown) positioned between at least two light source beam and/or at least to output sections of the light guides. The diffuser regions are adapted to receive light from at least one of the light sources of the third group of light sources and to diffuse the received light. The diffuser regions can for instance be provided by embodying the solid body 722 of a transparent material and providing diffusing properties to the areas between the light collecting means 705 and/or the light guides 713 and 714. The third group of light sources can be arranged in pixels as the second group of light sources and can thus be used to generate graphical content.

Figure 8A:
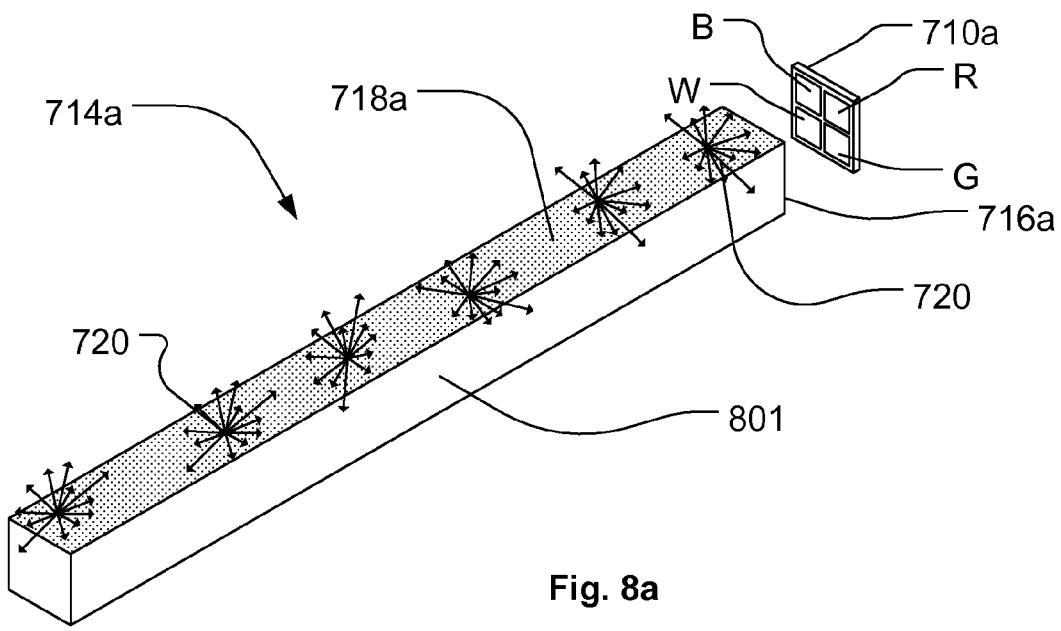
FIG. 8a-8b illustrate possible embodiments of light guides used in the illumination device in FIG. 7a-7d.
Figure 8B:
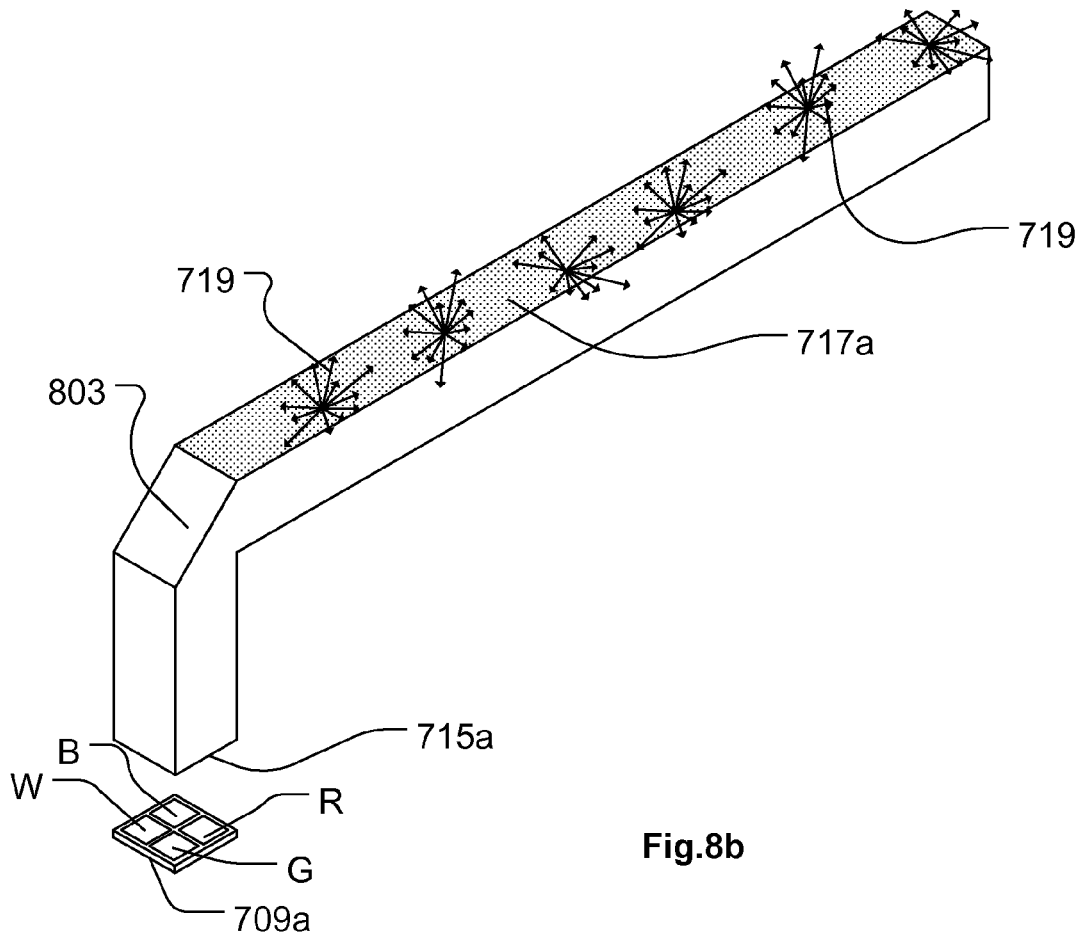

FIG. 8a and FIG. 8b respectively illustrated the two types light guides used in FIG. 7a-7d. The light guide in FIG. 8a correspond the light guide 714a which is adapted to receive light form the light sources 710a arranged circumferentially around the PCB 704. The light guide is constructed of a transparent rod 801 comprising an input section 716a and an output section 718a. The output section constitutes one surface of the rod and has been treated such that the light will be coupled out of this surface as illustrated by arrows 720. In this embodiment the light source 710a is a 4 in 1 LED light source comprising a red die R, Green die G, blue die B and white die W and can thus create a large amount of different color by using additive color mixing. The light rod assists also in mixing the colors from the 4 LED dies. The light guide in FIG. 8b correspond the light guide 713a which is adapted to receive light form the light sources 709a positioned on the PCB 704 through the input section 715a. This light guide comprises a bend 803 which is adapted to reflect light coming from the input section towards the output section 717a.

It is noted that:
the Invention applies to both multichip LEDs and single color LEDs.
the Invention applies to both profile and wash luminaires.
the invention applies to any light source technology.
that the invention eliminates or minimizes the dotted look of an LED lighting fixture with multiple LED lenses exposed to the spectator.
the second light source group can be used as new additional effect feature on the fixture and function both as an attention gimmick, but more importantly as an individual pixel when used in multiple unit setups. So it is both a mid-air beam and a lit up surface.
the second light source group can also be used to indicate errors or other fixture status information.
the invention creates a possibility of making the light/color visible from other angles than purely from the front.
the secondary light source can be used as an interactive part of the fixture—reacting according to surroundings.
the illumination device according to the present invention when the fixture is used in multiple unit setups (eg. a large scale matrix) the primary light source can be turned off or dimmed, so the fixture changes from being an automated mid-air beam to become a graphical pixel with a glowing non-blinding surface. Appropriate effect generator controls (eg. media servers) are then able to display video content or simple color waves/patterns on the complete fixture setup.
the user will be able to run two individual light sequences or media content on the same fixture.—one content generated by the first group of light sources and another content generated by the second group of light sources.
That error messages or fixture status can be communicated via colors, color combinations, flashes or other effects by the secondary light source
that via an internal or external sensing/tracking technology, the secondary light source can act according to a predefined reaction pattern (color, intensity or flashing). The input could be persona behavior, temperature changes, room light level, humidity etc.)

The invention claimed is:

1. An illumination device comprising:
a first group of light sources and a number of light collecting means, said light collecting means collect light from said first group of light sources and convert said collected light into a number of source light beams, said illumination device controlling said first group of light sources based on a light input signal indicative of at least one light parameter; and
a second group of light sources arranged in an array of pixels, each of said pixels comprises at least one light source and each of said pixels is individually controllable, said illumination device controlling said pixels based on a video signal;
wherein said first group of light sources and said second group of light sources are individually controllable, and wherein at least one of said pixels emits light at an area between at least two of said source light beams;
wherein said first group of light sources and said number of light collecting means are arranged in a housing from which said source light beams are emitted; and
wherein said housing comprises a diffuser cover comprising:
at least one diffuser region, said diffuser region receives light generated by said at least one of said pixels and diffuses said received light; and
a plurality of non-diffusing regions through which at least a part of said number of source light beams pass without being diffused, said plurality of non-diffusing regions being separated by at least one of said diffuser regions, and each of said non-diffusing regions being completely surrounded by said diffuser regions.

2. The illumination device according to claim 1 further comprising:
   at least one light guide comprising an input section and an output section, said light guide receives light generated by at least one of said pixels at said input section and internally reflects and transfers said received light within said light guide to said output section, said output section emitting and diffusing said received light at an area between and in a direction of at least two of said source light beams.

3. The illumination device according to claim 2 wherein said output section diffuses said received light in 180 degrees of direction.

4. The illumination device according to claim 1 wherein the non-diffusing regions are formed as apertures in a plane transparent surface arranged above said first light group of light sources, and wherein said diffuser region diffusing said received light in 180 degrees of direction.

5. The illumination device according to claim 4 where said apertures each accommodate and receive an output end of a respective said light collecting means, wherein an input end of the respective said light collecting means encompasses a respective light source of the first group of light sources, said light collecting means having a length spanning a distance between said first group of light sources and the plane surface of the diffusing region.

6. The illumination device according to claim 1 wherein said non-diffusing regions are formed as clear areas arranged above said light collecting means, and wherein said diffuser region diffusing said received light in 180 degrees of direction.

7. The illumination device according to claim 6 wherein said clear areas are configured to adjust beam divergence of the source light beams to provide outgoing light beams such that said outgoing light beams still form well-defined light beams.

8. The illumination device according to claim 1 wherein at least a part of said diffuser cover protrudes from said housing, wherein the at least one diffuser region includes a front of the diffuser cover and sides of the diffuser cover protruding from said housing, wherein diffused light is emitted forwards, sideways and backwards relative to a forward direction of the source light beams.

9. An illumination device comprising:
   a first group of light sources annularly arranged on a board, each light source of the first group having a lens to collect light therefrom and to emit a source light beam;
   a second group of light sources annularly arranged on the board, where light sources of the first and of the second group are positioned on the board to alternate radially from a center of the board; and
   a diffuser cover separate from and located above the board, the diffuser cover comprising:
      a diffusing region that receives and diffuses light from the second group of light sources; and
      a plurality of non-diffusing regions, each non-diffusing region aligned above a respective light source of the first group;
      wherein each non-diffusing region passes a source light beam therethrough, without being diffused, from the respective light source of the first group;
   wherein the second group of light sources emits light to, through and beyond the diffusing region to areas located between the source light beams;
   wherein each non-diffusing region is completely bordered by the diffusing region; and
   wherein the first group of light sources and the second group of light sources are individually controlled.

10. The illumination device according to claim 9, wherein each non-diffusing region is completely encircled by the diffusing region, and the diffusing region diffuses light in 180 degrees of direction.

11. The illumination device according to claim 10 wherein the non-diffusing regions are formed as apertures in the diffuser cover.

12. The illumination device according to claim 11 where said apertures each receive and retain an output end of a respective said lens, wherein an input end of the respective said lens encompasses a respective light source of the first group of light sources, said lens having a length spanning a distance between said first group of light sources and the diffuser cover.

13. The illumination device according to claim 12 where the board and diffuser cover are planar and are aligned in parallel.

14. The illumination device according to claim 13 wherein, at any given radius from the center of the board, only light sources of the first group, or of the second group, are located.

15. The illumination device according to claim 9 wherein said non-diffusing regions are formed as clear areas above said lens, and wherein said diffuser region diffusing said received light in 180 degrees of direction.

16. The illumination device according to claim 15 wherein said clear areas adjust beam divergence of the source light beams.

17. An illumination device comprising:
   a first group of light sources annularly arranged on a board, each light source of the first group having a lens to collect light therefrom and to emit a source light beam generally forwardly;
   a second group of light sources annularly arranged on the board, each light source of the second group not having a lens, wherein light sources of the first and of the second group are positioned on the board to alternate radially from a center of the board; and
   a diffuser cover located separate from and parallel with the board, wherein respective lenses span a distance between the board and the diffuser cover, the diffuser cover comprising:
      a diffusing region that receives and diffuses light only from the second group of light sources; and
      a plurality of non-diffusing regions, each non-diffusing region aligned above a respective light source of the first group;
      wherein each non-diffusing region passes a respective source light beam therethrough, without being diffused, from the respective light source of the first group, as collected from the respective lens;
   wherein the second group of light sources emits light to the diffuser cover, from the board, between respective lens of lights of the first group of light sources, through the diffusing region in 180 degrees of direction;
   wherein each non-diffusing region is completely bordered by the diffusing region;
   wherein the first group of light sources and the second group of light sources are individually controlled; and
   wherein the first and the second group of light sources emit light of substantially the same color, and the diffusing regions and non-diffusing regions emit light of varying brightness, whereby a dotted look of total emitted light by the device is avoided.

18. The illumination device according to claim 17 further comprising:

at least one light guide comprising an input section and an output section, said light guide receives light generated by at least one of a pixel of the second group of light sources at said input section and internally reflects and transfers said received light within said light guide to said output section, said output section emitting and diffusing said received light at an area between and in a direction of at least two of said source light beams, wherein internally reflecting light within the light guide is reflection totaling more than 90 degrees, and diffusing said received light is diffusion in 180 degrees of direction.

19. The illumination device according to claim 18, wherein at least a part of said diffuser cover protrudes from said housing, wherein the at least one diffuser region includes a front of the diffuser cover and sides of the diffuser cover protruding from said housing, wherein diffused light is emitted forwards, sideways and backwards relative to a forward direction of the source light beams.

* * * * *